UNITED STATES PATENT OFFICE.

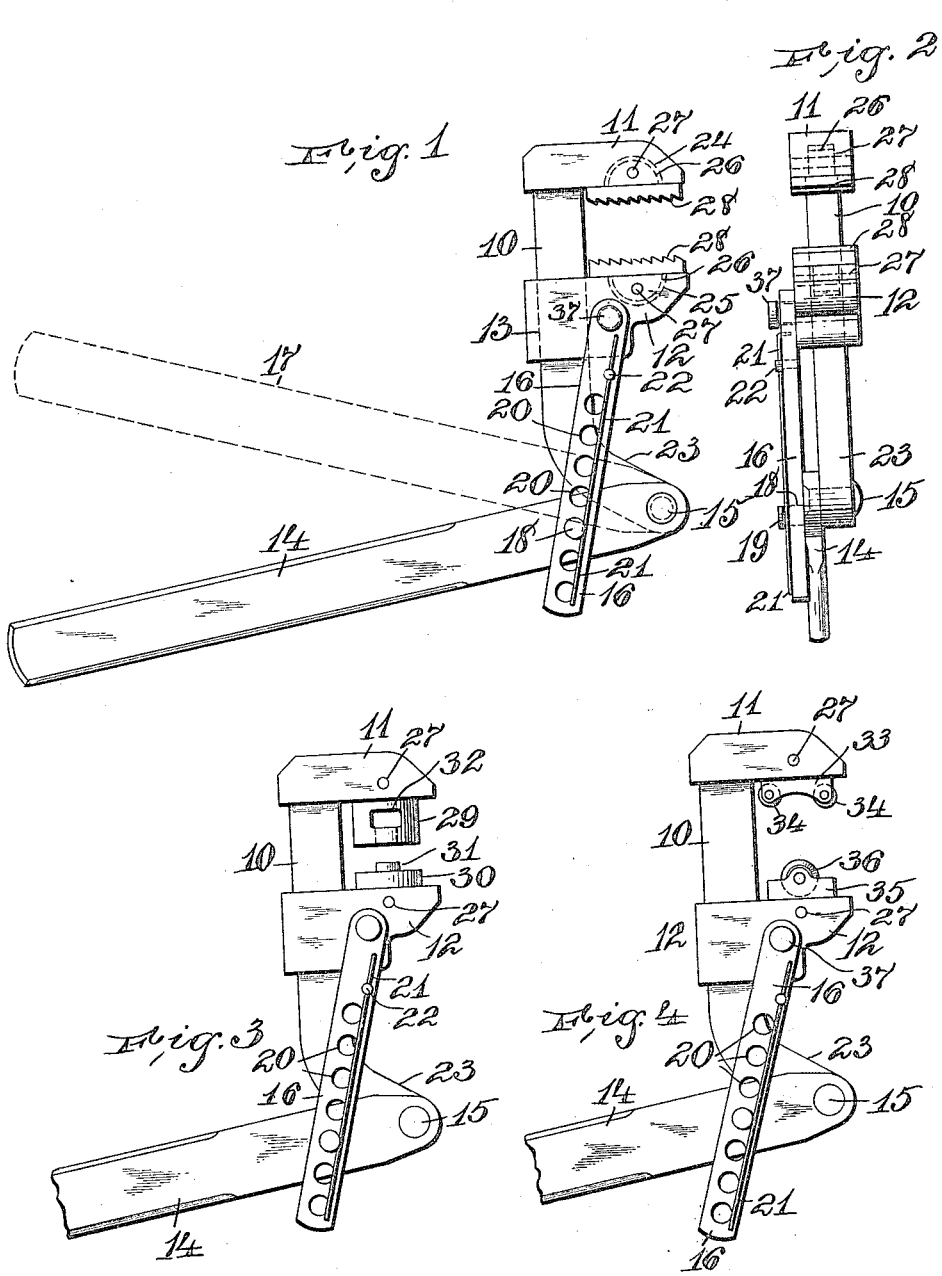

HERMAN YSSKIN, OF NEWARK, NEW JERSEY.

WRENCH.

1,140,862.

Specification of Letters Patent.

Patented May 25, 1915.

Application filed July 12, 1913. Serial No. 778,808.

*To all whom it may concern:*

Be it known that I, HERMAN YSSKIN, a citizen of the United States, and a resident of Newark, county of Essex, and State of New Jersey, have invented certain new and useful Improvement in Wrenches, of which the following is a specification.

This invention relates to an improved implement for exerting pressure, and is designed for use as a monkey wrench, pipe wrench, a pipe cutter, punching press, and numerous other devices in which pressure is utilized on material that is being worked, the implement being so devised that the handle regulates the movement of the sliding jaw, the handle swinging at the side of the shank of the device opposite the side from which the jaws project so that pressure on the handle, when transmitted to the sliding jaw, is also pressure from the rear of the shank to force the jaws more tightly on the object that is grasped so that there is no possibility of the implement slipping off.

The invention further provides an implement in which an adjustable connection is provided between the handle and the sliding jaw so that the position of the handle, when exerting its pressure against the jaw, can be varied so as to make it more pronounced longitudinally of the shank or more pronounced in a direction in rear of the shank.

The invention also consists in the provision of a quickly detachable means for regulating the relation of the link to the handle or to the jaw.

The invention is illustrated in the accompanying drawing, in which the implement is shown in Figure 1 in the form of a wrench having jaws as are present in a Stillson wrench or pipe wrench, and Fig. 2 is a front view of the wrench shown in Fig. 1. Fig. 3 is a modified form of device with the serrated blocks of the wrench removed, showing a die and a plunger placed therein so that the device can be used as a punch. Fig. 4 is a view similar to Fig. 3, but illustrating elements attached to the jaws, which elements permit the use of the implement as a pipe cutter.

The invention consists of a shank 10 which is provided with a fixed jaw 11 at one end, and for the purpose of this specification to define the parts I will call the side from which the jaw projects, the front of the wrench. A sliding jaw 12 is arranged to slide on the shank by reason of the jaw being perforated at its back end as at 13, whereby the jaws 11 and 12 can coöperate between them for pressing anything placed therein when the sliding jaw is forced toward the fixed jaw. A handle 14 swings on the shank, usually by means of a pin 15, the handle swinging to the rear of the shank, that is, it swings to the side opposite the side from which the jaws 11 and 12 project. A link 16 is connected to the sliding jaw and to the handle so that when the handle is swung, the jaw 12 is slid along the shank. The usual method of attaching the link to the swinging jaw is by means of the stud 37. The link is preferably attached to the sliding jaw at a point in front of the shank and to the handle at a point that brings the link to a forwardly and upwardly inclined position when the jaws are in a position about to grasp an object.

When the handle is in the dotted position 17, the jaw 12 is pressed farther toward the jaw 11 than when it is in the position shown in full lines in Fig. 1. The handle when pressed down to the dotted position forces the sliding jaw toward the fixed jaw, but also acts to push the whole wrench, that is particularly the shank portion and the jaws, more tightly on the object that is being grasped between the jaws. For instance, when the wrench is being used as a monkey wrench without any teeth, it is pushed onto the nut on which it is placed by the act of closing the jaws, since the pressure is from the rear of the shank toward the front, and since the jaws are on the front of the shank, the shank acts to limit the pressure in a forward direction of the wrench.

I prefer to make the link 16 adjustable in its connection with the jaw and the handle, one form being shown in the drawing consisting of a stud 18 which is arranged on a handle and has a head 19 thereon which is shown particularly in Fig. 2. Perforations 20 are arranged longitudinally along the link and are adapted to go over the head of the stud and to fit on the stud when the link is in place, the link also having a spring 21 which extends along the edges of the perforations and fits under the head 19 of the stud and thus holds the link against accidental removal from the stud. When it is to be removed, the finger is pressed against the spring to move it away from the edge of the stud and allow the link to be moved over the stud sufficiently to permit the link to be moved so that another perforation can be placed over the stud. The spring is usually fastened by seating it in a pin 22 fastened to the link. I find that I have better results by placing the pin 15 in the end of an offset portion 23 on the shank, this offset portion extending from the shank to the front thereof and permitting a better arrangement of the link on the handle and giving it a sufficient leverage without moving it too far back and allowing the proper longitudinal pressure on the sliding jaw, and also providing for a sufficient forward pressure to seat the jaws well on the object on which they are exerting a pressure.

I prefer to provide the jaws with recesses 24 and 25 in which are placed suitable blocks 26 which are held therein by pins 27 and are so held that the pins can be removed and the blocks taken from the jaws. In Fig. 1 I show such blocks 26 provided with teeth 28 so that the implement can be used as a pipe wrench, the teeth on the fixed jaw being arranged so that they project toward the front of the wrench or away from the shank, and the teeth on the sliding jaw being arranged so that they project to the rear or toward the shank.

In Fig. 3 I illustrate the implement with the blocks 26 removed and replaced by a die 29 and a block 30 with a punch 31 so that the device can be used as a punching press which is very handy in some positions where a workman has an operation to perform which can be easily done by a portable press. The die 29 is illustrated as having an opening 32 to provide for the removal of pieces punched by the press.

In Fig. 4 I illustrate jaws provided with elements which permit the use of the implement as a pipe cutter, one of the jaws having a block 33 with small cutting wheels 34 thereon and a block 35 having a cutter 36. It will be noted from this figure that the handle can be swung to tightly force the cutters against a pipe to be cut, and constantly, while exerting such pressure, provide for the swinging of the cutter on the pipe whereby it can be rotated wholly around the pipe and the operation is made continuous if desired.

It will be understood that changes or modifications can be made in this device without departing from the scope of this invention.

Having thus described my invention, what I claim is:—

An implement for exerting pressure comprising a shank having on one end a fixed jaw and on the other end an offset portion, both projecting a material distance from the shank and to the same side, a sliding jaw on the shank between the fixed jaw and the offset portion, a handle pivoted at its end to the end of the offset portion and swinging freely alongside said portion and alongside the shank above said offset portion, a link pivotally connected to the handle at a point substantially in line with the shank that is swung to a position when the handle is swung to a position transverse to said shank, said link being pivotally connected to the sliding jaw at a point in front of the shank.

In testimony that I claim the foregoing, I have hereunto set my hand, this 11th day of July, 1913.

HERMAN YSSKIN.

Witnesses:
Wm. H. Camfield,
M. A. Johnson.

Copies of this patent may be obtained for five cents each, by addressing the "Commissioner of Patents, Washington, D. C."